(12) United States Patent
Pham et al.

(10) Patent No.: US 9,725,898 B2
(45) Date of Patent: Aug. 8, 2017

(54) LAMINATE ACOUSTIC PANEL (71) Applicant: ARMSTRONG WORLD INDUSTRIES, INC., Lancaster, PA (US)

(72) Inventors: Phi-Oanh R. Pham, Lancaster, PA (US); Jeffrey Scott Roberts, Columbia, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 15/207,844

(22) Filed: Jul. 12, 2016

(65) Prior Publication Data
US 2016/0319538 A1 Nov. 3, 2016

Related U.S. Application Data (63) Continuation of application No. 14/643,453, filed on Mar. 10, 2015, now Pat. No. 9,390,700.

(51) Int. Cl.
E04B 1/86 (2006.01)
E04B 9/04 (2006.01)
G10K 11/168 (2006.01)
B32B 37/12 (2006.01)
B32B 37/14 (2006.01)
E04B 9/06 (2006.01)
E04B 9/28 (2006.01)

(52) U.S. Cl.
CPC ............... *E04B 1/86* (2013.01); *B32B 37/12* (2013.01); *B32B 37/14* (2013.01); *E04B 9/045* (2013.01); *G10K 11/168* (2013.01); *B32B 2307/10* (2013.01); *E04B 9/068* (2013.01); *E04B 9/28* (2013.01)

(58) Field of Classification Search
CPC ... E04B 1/86; E04B 9/28; B32B 37/14; B32B 37/12
USPC ......................................................... 181/286
See application file for complete search history.

(56) References Cited

U.S. PATENT DOCUMENTS

| 3,183,996 | A | 5/1965 | Capaul |
| 4,201,247 | A | 5/1980 | Shannon |
| 5,202,174 | A | 4/1993 | Capaul |
| 6,443,256 | B1 | 9/2002 | Baig |
| 6,789,645 | B1 * | 9/2004 | Deblander ............... E04B 1/86 181/284 |
| 7,798,287 | B1 | 9/2010 | Surace et al. |
| 8,590,670 | B1 * | 11/2013 | Grube .................. E04F 15/182 181/286 |
| 8,734,613 | B1 | 5/2014 | Frank et al. |
| 8,807,276 | B2 * | 8/2014 | Guyader ................ B32B 15/04 181/204 |

(Continued)

FOREIGN PATENT DOCUMENTS

WO 90/01090 2/1990

OTHER PUBLICATIONS

Internatonal Search Report for Corresponding Application No. PCT/US2016/018650, mailed Aug. 9, 2016. WO.

(Continued)

*Primary Examiner* — Forrest M Phillips
(74) *Attorney, Agent, or Firm* — Craig M. Sterner (57) ABSTRACT Described herein is a laminate acoustic panel comprising a first layer and a second layer, as well as a ceiling system that includes the laminate acoustic panel.

19 Claims, 7 Drawing Sheets (56) References Cited

U.S. PATENT DOCUMENTS

| | | |
|---|---|---|
| 2005/0263346 A1 | 12/2005 | Nishimura |
| 2006/0289230 A1* | 12/2006 | Connelly ................. B32B 5/26 181/290 |
| 2007/0272482 A1 | 11/2007 | Yamaguchi |
| 2008/0128202 A1 | 6/2008 | Palumbo et al. |
| 2010/0044148 A1 | 2/2010 | Tanase |
| 2010/0230206 A1* | 9/2010 | Tinianov ................. B32B 3/00 181/286 |
| 2010/0258378 A1* | 10/2010 | Ravnaas ................. E04B 1/86 181/286 |
| 2013/0087409 A1 | 4/2013 | Payot et al. |
| 2013/0118831 A1 | 5/2013 | Kawai et al. |
| 2014/0014437 A1 | 1/2014 | Wilson |
| 2014/0265413 A1 | 9/2014 | Demo et al. |

OTHER PUBLICATIONS

Product Information Sheet, "LYRA (tm) Square Lay-In, Tegular (smooth texture)," pp. 186A-D, Armstrong.com/commceilings. US. Partial Internatonal Search Report for Corresponding Application No. PCT/US2016/018650, mailed May 17, 2016. WO.

* cited by examiner

LAMINATE ACOUSTIC PANEL

CROSS-REFERENCE TO RELATED APPLICATIONS

This application is a continuation of U.S. patent application Ser. No. 14/643,453 filed on Mar. 10, 2015. The disclosure of the above application is incorporated herein by reference.

FIELD OF INVENTION

Embodiments of the present invention relate to laminate acoustic ceiling panels, methods for preparing laminate acoustic ceiling panels, and ceiling systems comprising the laminate acoustic ceiling panels.

BACKGROUND

Various types of ceiling systems have been used in commercial and residential building construction to provide the desired acoustical performance. Noise blocking between rooms is required for a variety of purposes, including speech privacy as well as not bothering the occupants of adjacent rooms. Sound dampening within a single room is also required for a variety of purposes, including decreasing volume levels within a single space.

Previous attempts have been made to improve noise blocking between adjacent rooms. However, such previous attempts have either been directed to single layered structures or laminate-structures having layers that are bonded together across substantially the entire interface of layers. Such previous attempts fail to address how the interface between layers impacts both noise blocking and sound dampening characteristics of the acoustic ceiling panels. Thus, there is a need for a new laminate acoustic ceiling panel having an interface that can enhances the desired acoustical properties.

SUMMARY

According to some embodiments, the present invention is directed to an acoustic ceiling panel comprising: a first layer comprising a first major surface and a second major surface, the second major surface of the first layer defined by a perimeter, the second major surface of the first layer comprising a perimeter region adjacent the perimeter of the second major surface of the first layer and a central region circumscribed by the perimeter region of the second major surface of the first layer; a second layer comprising a first major surface and a second major surface, the first major surface of the second layer defined by a perimeter, the first major surface of the second layer comprising a perimeter region adjacent the perimeter of the first major surface of the second layer and a central region circumscribed by the perimeter region of the first major surface of the second layer; and wherein the second major surface of the first layer is coupled to the first major surface of the second layer and each of the central region of the second major surface of the first layer and the central region of the first major surface of the second layer being free of adhesive, whereby the first and second layers are coupled to each other to form a multilayer panel.

According to other embodiments, the present invention is directed to an acoustic ceiling panel having a first major surface opposite a second major surface, the acoustic ceiling panel comprising: a first layer having a first NRC value and a first CAC value, the first layer comprising a first major surface and a second major surface, and the second major surface of the first layer comprising a first central region; a second layer having a second CAC value and a second NRC value, the second layer comprising a first major surface and a second major surface, and the first major surface of the second layer comprising a second central region; the second major surface of the first layer is coupled to the first major surface of the second layer and each of the first central region and second central region being free of adhesive; and wherein the second CAC value is greater than the first CAC value, and the first NRC value is greater than the second NRC value.

In other embodiments, the present invention is directed to a method of forming an acoustic ceiling panel comprising: providing a first layer and a second layer, the first layer having a first major surface opposite a second major surface, the second major surface of the first layer having a first central region circumscribed by a first perimeter region, and the second layer having a first major surface opposite a second major surface, the first major surface of the second layer having a second central region circumscribed by a second perimeter region; applying adhesive to at least one of the second major surface of the first layer or the first major surface of the second layer such that no adhesive is present in either the first central region or the second central region; and joining the second major surface of the first layer to the first major surface of the second layer to form a multilayer panel.

BRIEF DESCRIPTION OF THE DRAWINGS

The features of the exemplary embodiments of the present invention will be described with reference to the following drawings, where like elements are labeled similarly, and in which.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

Figure 1:
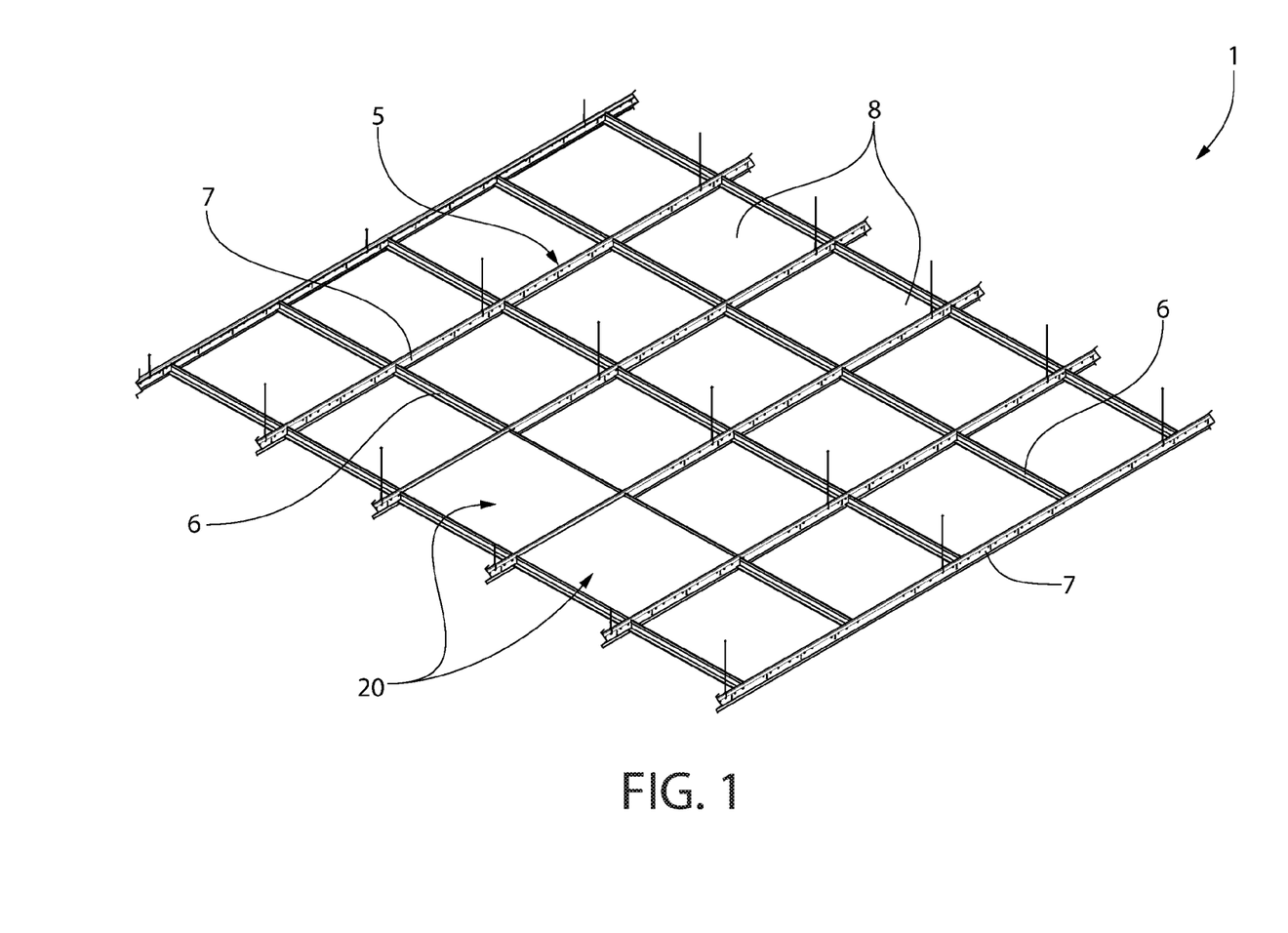
FIG. 1 is a perspective view of the ceiling system according to the present disclosure.
Figure 2:
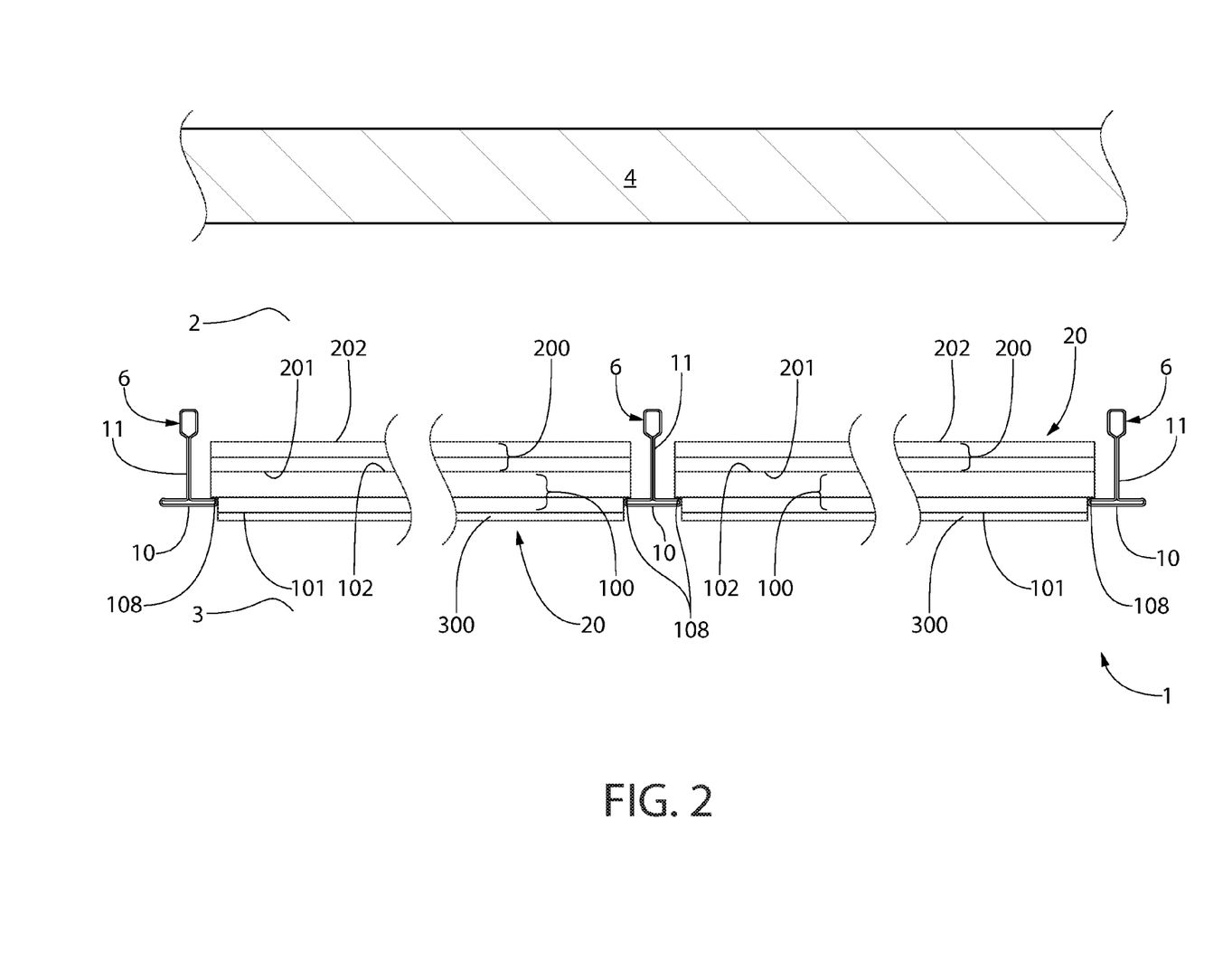
FIG. 2 is a side profile view of a portion of the ceiling system 1 according to the present disclosure.

As shown in FIGS. 1 and 2, the present invention is directed to a ceiling system 1 comprising a ceiling grid 5 and at least one acoustic ceiling panel 20. A plenary space 2 may exist above the ceiling grid 5. The plenary space 2 is the space that exists above the acoustic ceiling panels 20 and above the ceiling grid 5 and below a roof or a subfloor 4 of an above adjacent floor in a building. The plenary space 2 provides room for mechanical lines to be run throughout a building—e.g. HVAC, plumbing, data lines, etc. A room environment 3 may exist below the acoustic ceiling panels 20 and below the ceiling grid 5. The room environment 3 is the space occupied by inhabitants of a room—e.g. room environments 3 in an office building would be the space occupied by desks, office workers, computers, etc. The combination of the ceiling grid 5 and the acoustic ceiling panels 20 may act as an acoustic and aesthetic barrier between the room environment 3 and the plenary space 2, as well as a sound deadening layer for noise that exists within the room environment 3, as discussed herein.

The ceiling grid 5 may comprise a plurality of first members 6 extending parallel to each other. In some embodiments, the ceiling grid 5 may further comprise a plurality of second members 7 that extend parallel to each other. The plurality of first members 6 may intersect the plurality of second members 7 to form a grid pattern having a plurality of grid openings 8. In some embodiments, the plurality of first members 6 intersects the plurality of second members 7 at a substantially perpendicular angle, thereby forming rectangular grid openings 8. The rectangular grid openings 8 may be square or any other shape that is aesthetical or functional.

As shown in FIG. 2, each of the plurality of first members 6 and each of the plurality of second members 7 may comprises T-bars having a horizontal flange 10 and a web 11. The plenary space 2 exists above the T-bars and the room environment 3 exists below the T-bars.

The ceiling system 1 of the present disclosure comprises at least one acoustic ceiling panel 20 that is mounted to the ceiling grid 5 within one of the plurality of grid openings 8. The ceiling system 1 may comprises a plurality of acoustic ceiling panels 20 mounted to the ceiling grid 5, each of the plurality of acoustic ceiling panels 20 resting within one of the plurality of grid openings 8. In some embodiments, something other than the acoustic ceiling panel 20 (for example, light fixture or an air duct vent) may be mounted to the ceiling grid 5 within at least one of the grid openings 8 (not pictured).

As demonstrated by FIGS. 3-6, the acoustic ceiling panel 20 may comprise a first layer 100 and a second layer 200. In some embodiments of the present invention, the acoustic ceiling panel 20 may further comprise a scrim 300. As demonstrated by FIG. 2, the acoustic ceiling panel 20 may be mounted on the ceiling grid 5 of the ceiling system 1 so that the first layer 100 of the acoustic ceiling panel 20 is adjacent to the room environment 3 and the second layer 200 is adjacent to the plenary space 2.

Figure 4:
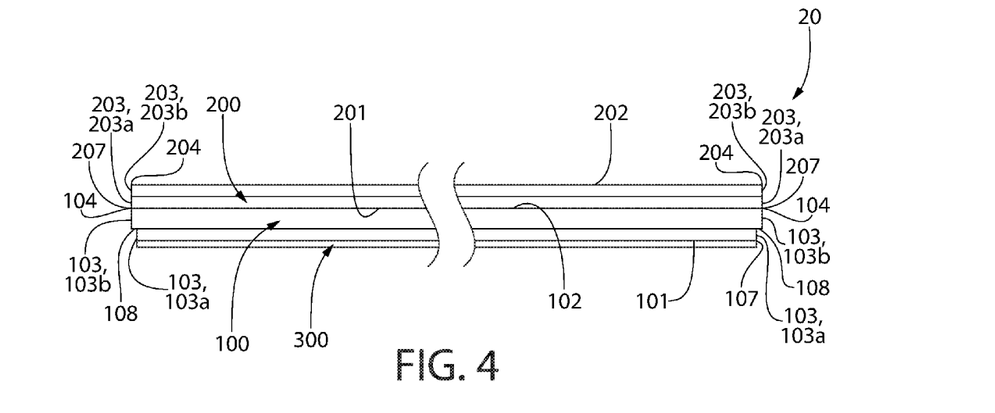
FIG. 4 is a side view of the ceiling panel according to the present disclosure.
Figure 5:
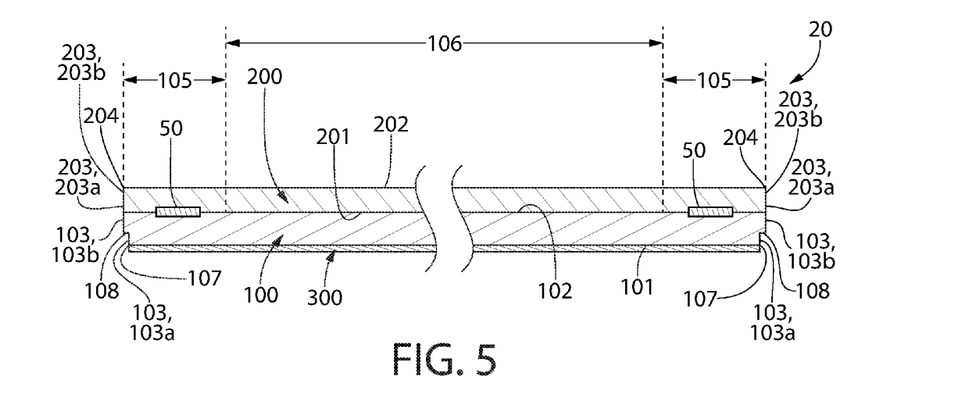
FIG. 5 is a cross-sectional view of the ceiling panel according to the present disclosure along line IV of FIG. 3.
Figure 6:
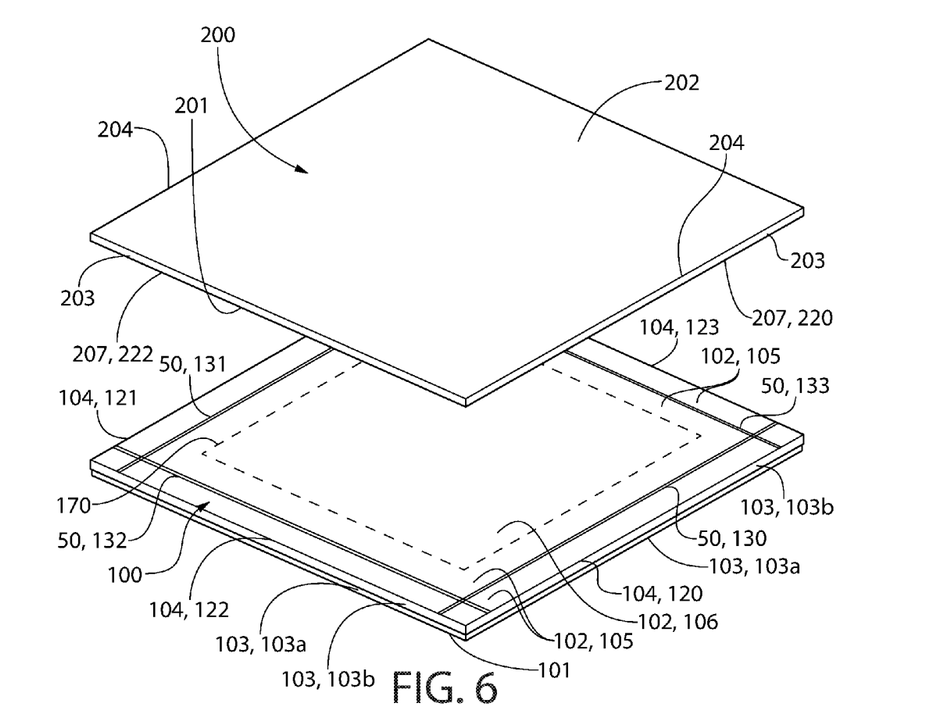
FIG. 6 is a perspective view of the first layer and the second layer of the ceiling panel according to the present disclosure, wherein the first and second layer are separated.

As shown by FIGS. 4-6, the first layer 100 of the acoustic ceiling panel 20 comprises a first major surface 101 and a second major surface 102. The first layer 100 further comprises a side surface 103 extending between the first major surface 101 and the second major surface 102. The side surface 103 of the first layer 100 intersects the first major surface 101 of the first layer 100 to form a lower edge 107 of the first layer 100. The side surface 103 of the first layer 100 intersects the second major surface 102 of the first layer 100 to form an upper edge 104 of the first layer 100.

In some embodiments of the present invention, the side surface 103 of the first layer 100 may comprise a stepped profile having an upper side surface 103b and a lower side surface 103a. The lower side surface 103a of the first layer 100 intersects the first major surface 101 of the first layer 100 to form the lower edge 107 of the first layer 100. The upper side surface 103b of the first layer 100 intersects the second major surface 102 of the first layer 100 to form the upper edge 104.

An intermediate surface 108 extends between the lower side surface 103a and the upper side surface 103b in a direction that is substantially perpendicular to the side surface 103, the upper side surface 103a, and the lower side surface 103b of the first layer 100. In some embodiments, the intermediate surface 108 faces the same direction as the first major surface 101 of the first layer 100. In other embodiments, the intermediate surface 108 faces a direction oblique to the first major surface 101.

The stepped profile comprises the combination of the upper side surface 103b, the intermediate surface 108, and the lower side surface 103a. According to this embodiment, the second major surface 102 of the first layer 100 has an area that is greater than an area of the first major surface 101 of the first layer 100. In some embodiments the surface area of the second major surface 102 of the first layer 100 is equal to the sum of the area of the first major surface 102 and the area of the intermediate surface 108 of the first layer 100. As shown in FIG. 2, after the acoustic ceiling panel 20 have been mounted to the ceiling grid 5, the intermediate surface 108 of the first layer 100 may abut at least a portion of a top surface of the horizontal flange 10 of at least one of the first member 6 or the second member 7 of the ceiling grid 5. The abutment between the intermediate surface 108 of the first layer 100 and the top surface of the horizontal flange 10 allows the acoustical ceiling panel 10 to rest in a fully installed position As shown in FIGS. 6-10, the upper edge 104 of the first layer 100 forms a perimeter of the second major surface 102 of the first layer 100. The second major surface 102 comprises a perimeter region 105 that is adjacent to both the upper edge 104 of the first layer 100 and the perimeter of the second major surface 102. The second major surface 102 of the first layer 100 may further comprise a central region 106 that is circumscribed by the perimeter region 105 of the second major surface 102 of the first layer 100. FIGS. 6-10 show non-limiting embodiments of a dotted boundary 170 between the central region 106 and the perimeter region 105 of the first layer 100. In FIGS. 6-10, the dotted boundary 170 is rectangular; however, the present invention does not limit the shape of the dotted boundary 170 to any particular shape (e.g., polygon, circle, ellipsis, non-geometric shapes, etc.).

The upper edge 104 of the first layer 100 comprises a first upper edge portion 120, a second upper edge portion 121, a third upper edge portion 122, and a fourth upper edge portion 123. The second upper edge portion 121 is opposite the first upper edge portion 120, and the fourth upper edge portion 123 is opposite the third upper edge portion 122. The third upper edge portion 122 extends between the first upper edge portion 120 and the second upper edge portion 121. The fourth upper edge portion 123 extends between the first upper edge portion 120 and the second upper edge portion 121.

In some embodiments, the third upper edge portion 122 extends perpendicular to both of the first upper edge portion 120 and the second upper edge portion 121. In some embodiments, the fourth upper edge portion 123 extends substantially perpendicular to both of the first upper edge portion 120 and the second upper edge portion 121. In some embodiments the first upper edge portion 120 extends substantially parallel to the second upper edge portion 121.

In some embodiments, the stepped profile of the first layer 100 may be present on each of the side surfaces 103 of the first layer 100. In other embodiments, the stepped profile may only be present on two opposite side surfaces 103 of the first layer 100. For example, the side surfaces 103 of the first layer 100 that form the first upper edge portion 120 and the second upper edge portion 121 may comprise a stepped profile while the side surfaces 103 of the first layer 100 that form the third upper edge portion 122 and the fourth upper edge portion 123 do not comprise a stepped profile. In a preferred embodiment, the first layer 100 is closer to the sound source, e.g., the room environment 3.

In some embodiments, the first layer 100 may be comprised of fiberglass, mineral wool (such as rock wool, slag wool, or a combination thereof), synthetic polymers (such as melamine foam, polyurethane foam, or a combination thereof), mineral cotton, silicate cotton, or combinations thereof. In some embodiments the first layer 100 is produced from fiberglass. In some embodiments the first layer 100 predominantly provides a sound absorption function and preferred materials for providing the sound absorption function for the first layer 100 include fiberglass The first layer provides a ceiling NRC rating of 0.7 or greater, preferably 0.9 or greater. NRC (Noise Reduction Coefficient) is further described below. In some non-limiting embodiments of the present disclosure, the first layer may be selected from the Optima™ and Lyra™ fiberglass panel lines produced by Armstrong (Armstrong World Industries, Inc.)—for example, Lyra 8372 or Optima 3251.

As demonstrated by FIGS. 3-6, the second layer 200 comprises a first major surface 201 and a second major surface 202. The second layer 200 may further comprise a side surface 203 extending between the first major surface 201 of the second layer 200 and the second major surface 202 of the second layer 200. The side surface 203 of the second layer 200 intersects the second major surface 202 of the second layer 200 to form an upper edge 204 of the second layer 200. The side surface 203 of the second layer 200 intersects the first major surface 201 of the second layer 200 to form a lower edge 207 of the second layer 200.

Figure 3:
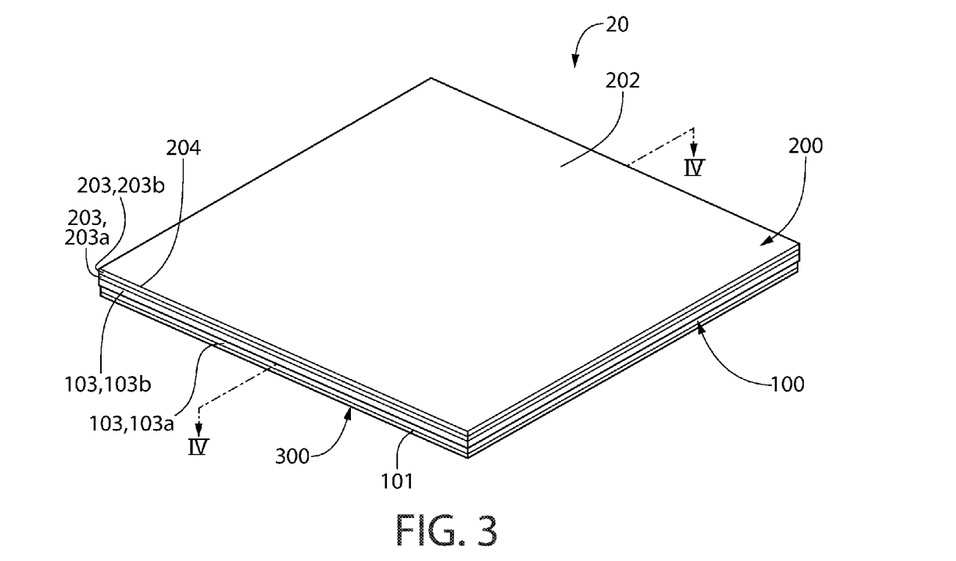
FIG. 3 is a perspective view of the ceiling panel according to the present disclosure.

As shown in FIGS. 3 and 6, the upper edge 204 of the second layer 200 forms a perimeter of the second major surface 202 of the second layer 200. As demonstrated in FIG. 11, the lower edge 207 of the second layer 200 forms a perimeter of the first major surface 201 of the second layer 200. The lower edge 207 of the second layer 200 comprises a first lower edge portion 220, a second lower edge portion 221, a third lower edge portion 222, and a fourth lower edge portion 223. The second lower edge portion 221 is opposite the first lower edge portion 220, and the fourth lower edge portion 223 is opposite the third lower edge portion 222. The third lower edge portion 222 extends between the first lower edge portion 220 and the second lower edge portion 221. The fourth lower edge portion 223 extends between the first lower edge portion 220 and the second lower edge portion 221.

As shown in FIGS. 4-6, the side surface 203 of the second layer 200 may further comprise an upper side surface 203b and a lower side surface 203a. The upper side surface 203b of the second layer 200 intersects with the second major surface 202 of the second layer 200 forming the upper edge 204 of the second layer 200. The lower side surface 203a of the second layer 200 intersects with the first major surface 201 of the second layer 200 forming the lower edge 207 of the second layer 200.

In some embodiments the upper side surface 203b of the second layer 200 is coplanar with the lower side surface 203a of the second layer 200—such that the area of the second major surface 202 of the second layer 200 is equal to the area of the first major surface 201 of the second layer. In some embodiments, the upper side surface 203b of the second layer 200 is beveled inward at an angle of 30, 45, or 60 degree angle relative to lower side surface 203a of the second layer—such that the area of the second major surface 202 of the second layer 200 is less than the area of the first major surface 201 of the second layer. In a preferred embodiment, the second layer 200 is away from the sound source, e.g., facing toward the plenary space 2.

In some embodiments the second layer 200 may comprise fiberglass, mineral wool (such as rock wool, slag wool, or a combination thereof), synthetic polymers (such as melamine foam, polyurethane foam, or a combination thereof), mineral cotton, silicate cotton, gypsum, or combinations thereof. In some embodiments the second layer 200 is produced from mineral wool. In some embodiments, the second layer 200 predominantly provides a sound attenuation function and preferred materials for providing the sound attenuation function for the second layer 200 include mineral wool. The second layer 200 provides a ceiling CAC rating of at least 35, preferably at least 40. CAC (Ceiling Attenuation Class) is further described below. In some non-limiting embodiments of the present disclosure, the second layer may be selected from the School Zone™ and Calla™ panel lines produced by Armstrong—for example, School Zone 1810.

As shown in FIG. 5, the acoustic ceiling panel 20 is formed by positioning the first major surface 201 of the second layer 200 adjacent to the second major surface 102 of the first layer 100, thereby creating an interface between the first layer 100 and the second layer 200. Specifically, the interface exists between the first major surface 201 of the second layer 200 and the second major surface 102 of the first layer 100.

The first layer 100 may be attached to the second layer 200 with an adhesive 50. Specifically, the second major surface 102 of the first layer 100 may be coupled to the first major surface 201 of the second layer 200 by the adhesive 50 to create a cohesively adhere the first and second layers 100, 200 to form a cohesive multilayer laminate. The second major surface 102 of the first layer 100 may be coupled to the first major surface 201 of the second layer 200 by the adhesive 50 so that the perimeter and the upper edge 104 of the first layer 100 is aligned with the perimeter and the lower edge 207 of the second layer 200. In other embodiments, the first layer 100 may be attached to the second layer 200 by mechanical coupling.

In some embodiments, the second major surface 102 of the first layer 100 and the first major surface 201 of the second layer 200 may be coupled by the adhesive 50 so that the first upper edge 120 of the first layer 100 is aligned with the first lower edge 220 of the second layer 200; the second upper edge 121 of the first layer 100 is aligned with the second lower edge 221 of the second layer 200; the third upper edge 122 of the first layer 100 is aligned with the fourth lower edge 223 of the second layer 200; and the fourth upper edge 123 of the first layer 100 is aligned with third lower edge 222 of the second layer 200.

In some embodiments, the first layer 100 and the second layer 200 may be coupled so that the perimeter and the upper edge 104 of the first layer 100 is not aligned with the perimeter and the lower edge 207 of the second layer 200 (not pictured). Specifically, the first upper edge 120 of the first layer 100 may extend oblique to the first lower edge 220 of the second layer 200. The second upper edge 121 of the first layer 100 may extend oblique to the second lower edge 221 of the second layer 200. The third upper edge 122 of the first layer 100 may extend oblique to the fourth lower edge 223 of the second layer 200. The fourth upper edge 123 of the first layer 100 may extends oblique to the third lower edge 222 of the second layer 200.

According to another embodiment of the present disclosure, the area of the first major surface 201 of the second layer 200 may be larger than the area the second major surface 102 of the first layer 100, thereby leaving at least a portion of the first major surface 201 of the second layer 200 exposed (not pictured). The exposed portion of the first major surface 201 of the second layer 200 creates a step between the side surface 103 of the first layer 100 and the side surface 203 of the second layer 200. According to this embodiment, the perimeter of the first layer 100 is smaller than the perimeter of the second layer 200. The portion of the first major surface 201 of the second layer 200 that remains exposed by the step between the side surfaces 103, 104 may abut a portion of the top surface of the horizontal flange 10 of the first and second members 6, 7 after the acoustic ceiling panel 20 is mounted to the ceiling grid 5—similar to the intermediate surface 108 of the first layer 100 may abut the horizontal flange 10 of the first and second members 6, 7 of the ceiling grid 5. According to this embodiment, the first layer 100 has a side surface 103 that may or may not comprise the stepped profile of the lower side surface 103a, intermediate surface 108, and upper side surface 103b. In other embodiments, the area of the first major surface 201 of the second layer 200 may be smaller than the area the second major surface 102 of the first layer 100.

Each of the side surfaces 103 of the first layer 100 may extend coplanar to each of the side surfaces 203 of the second layer 200. Specifically, each of the upper edge portions 103b of the first layer 100 may extend coplanar to each of the lower edge portions 203a of the second layer 100.

The adhesive 50 may be applied to at least one of the perimeter region 105 of the second major surface 102 of the first layer 100 or the perimeter region 205 of the first major surface 201 of the second layer 200. The central region 106 of the second major surface 102 of the first layer 100 is substantially free of any adhesive 50 that couples the central region 106 of the second major surface 102 of the first layer 100 to the first major surface 201 of the second layer 200. The central region 206 of the first major surface 201 of the second layer 200 is substantially free of any adhesive that couples the central region 206 of the first major surface 201 of the second layer 200 to the second major surface 102 of the first layer 100.

In some embodiments, the central region 106 of the second major surface 102 of the first layer 100 is in free floating contact with the first major surface 201 of the second layer 200. In some embodiments, the central region 206 of the first major surface 201 of the second layer 200 is in free floating contact with the second major surface 102 of the first layer 100. The interface between the first major surface 201 of the second layer 200 and the second major surface 102 of the first layer is substantially free of adhesive within the central region 106 of the first layer 100 and the central region 206 of the second layer.

In some embodiments, the first layer 100 and the second layer 200 are coupled by mechanical attachment means (e.g., needle bunching, or clips) in addition to or alternatively to the adhesive 50. In some embodiments, the central region 106 of the first layer 100 is not in physical contact with the central region 206 of the second layer 200.

According to the present invention, the adhesive 50 may be any adhesive that provides structural integrity to the acoustic ceiling panel 20 having the attached first and second layers 100, 200 such that the acoustic ceiling panel 20 can be handled without separating the first and second layers 100, 200—e.g., even when certain section or sections of the acoustic ceiling panel 20 are cut for installation. Suitable adhesives include aqueous adhesives and solvent based adhesives, including adhesives of polyvinyl acetate, urethane, acrylates, and polyester. The adhesives may be a hot-melt adhesive, pressure sensitive adhesive, or acoustical adhesive. The adhesive may be applied as dots, continuous strips, or discontinuous strips to one or more of the perimeter regions 105, 205 of the first and second layers 100, 200 of the acoustic ceiling panel 20, as discussed further herein.

According to some embodiments of the present disclosure, the adhesive 50 applied to at least one of the perimeter region 105 of the second major surface 102 of the first layer 100 and the perimeter region 205 of the first major surface 201 of the second layer 200 comprises, for example, a plurality of adhesive strips. In other embodiments, the adhesive is applied in a pattern to minimize the area of contact between the first and second layers occupied by the applied adhesive. For example, the adhesive is applied as a dot in each of the four corners of the perimeter regions of a rectangular panel.

As shown in FIGS. 6-10, the plurality of adhesive strips may comprise a first adhesive strip 130, a second adhesive strip 131, a third adhesive strip 132, a fourth adhesive strip 133. The first adhesive strip 130, the second adhesive strip 131, the third adhesive strip 132, and the fourth adhesive strip 133 may each independently be a continuous or a discontinuous strip of adhesive. The first adhesive strip 130, the second adhesive strip 131, the third adhesive strip 132, and the fourth adhesive strip 133 may each independently be linear or curvilinear.

The first adhesive strip 130 may extend adjacent to the first upper edge portion 120 of the first layer 100. The second adhesive strip 131 may extend adjacent to the second upper edge portion 121 of the first layer 100. The third adhesive strip 132 may extend adjacent to the third upper edge portion 122 of the first layer 100. The fourth adhesive strip 133 may extend adjacent to the fourth upper edge portion 123 of the first layer 100. According to this embodiment, the first adhesive strip 130, the second adhesive strip, 131, the third adhesive strip 132, and the fourth adhesive strip 133 may each independently extend to the corresponding first upper edge portion 120, second upper edge portion 121, third upper edge portion 122, and fourth upper edge portion 123 at an oblique or substantially parallel angle.

Figure 11:
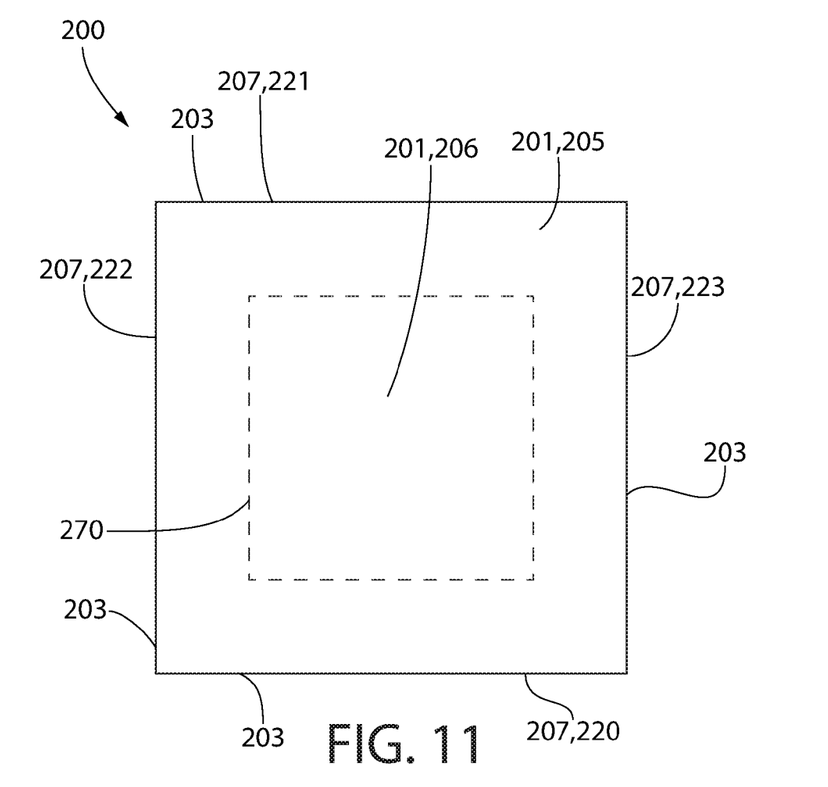
FIG. 11 is a bottom view of the second layer, showing the first major surface of the second layer according to another embodiment of the present disclosure.

In non-limiting the embodiments, the first adhesive strip 130 may extend adjacent to the first lower edge portion 220 of the second layer 200. The second adhesive strip 131 may extend adjacent to the second lower edge portion 221 of the second layer 200. The third adhesive strip 132 may extend adjacent to the third lower edge portion 222 of the second layer 200. The fourth adhesive strip 133 may extend adjacent to the fourth lower edge portion 223 of the second layer 200. According to this embodiment, the first adhesive strip 130, the second adhesive strip, 131, the third adhesive strip 132, and the fourth adhesive strip 133 may each independently extend to the corresponding first lower edge portion 220, second lower edge portion 221, third lower edge portion 222, and fourth lower edge portion 223 at an oblique or substantially parallel angle.

Figure 7:
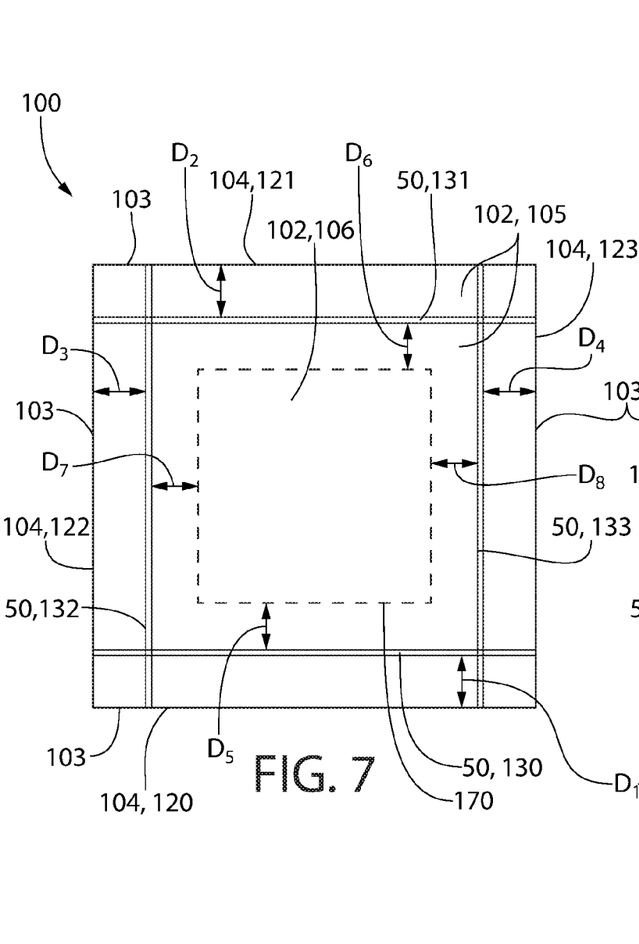
FIG. 7 is a top view of the first layer, showing the second major surface of the first layer according to one embodiment of the present disclosure.
Figure 8:
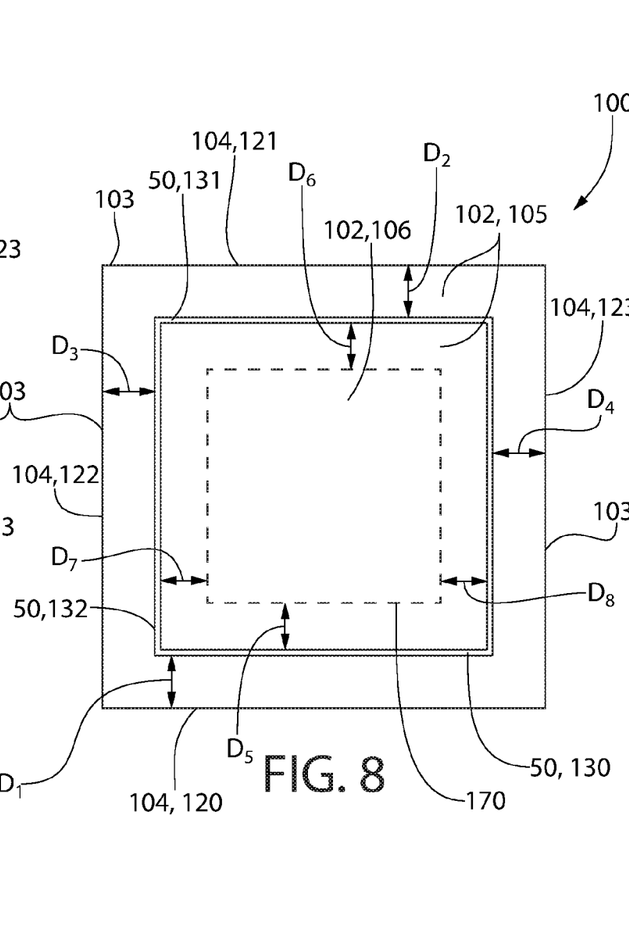
FIG. 8 is a top view of the first layer, showing the second major surface of the first layer according to another embodiment of the present disclosure.

As shown in FIGS. 7 and 8, the first adhesive strip 130 may be spaced a first distance $D_1$ from the first upper edge portion 120 of the first layer 100. The second adhesive strip 131 may be spaced a second distance $D_2$ from the second upper edge portion 121 of the first layer 100. The third adhesive strip 132 may be spaced a third distance $D_3$ from the third upper edge portion 122 of the first layer 100. The fourth adhesive strip 133 may be spaced a fourth distance $D_4$ from the fourth upper edge portion 123 of the first layer 100.

In some embodiments the first distance $D_1$, the second distance $D_2$, the third distance $D_3$, and the fourth distance $D_4$, each independently range from about ⅛ of an inch to about ⅝ of an inch. In some embodiments, the first distance $D_1$, the second distance $D_2$, the third distance $D_3$, and the fourth distance $D_4$, each independently range from about ¼ of an inch to about ½ of an inch. In some embodiments, the first distance $D_1$, the second distance $D_2$, the third distance $D_3$, and the fourth distance $D_4$, is about ⅜ of an inch.

The first adhesive strip 130 may be spaced from the dotted boundary 170 of the central region 106 by a fifth distance $D_5$. The second adhesive strip 131 may be spaced from the dotted boundary 170 of the central region 106 by a sixth distance $D_6$. The third adhesive strip 132 may be spaced from the dotted boundary 170 of the central region 106 by a seventh distance $D_7$. The fourth adhesive strip 133 may be spaced from the dotted boundary 170 of the central region 106 by an eighth distance $D_8$.

In some embodiments the fifth distance $D_5$, the sixth distance $D_6$, the seventh distance $D_7$, and the eighth distance $D_8$, each independently range from about 0 inches to about ⅝ of an inch. In some embodiments, the fifth distance $D_5$, the sixth distance $D_6$, the seventh distance $D_7$, and the eighth distance $D_8$, each independently range from about ⅛ of an inch to about ½ of an inch. In some embodiments, the fifth distance $D_5$, the sixth distance $D_6$, the seventh distance $D_7$, and the eighth distance $D_8$ is about 0 inches or about ⅜ of an inch.

According to the embodiments when the fifth distance $D_5$, the sixth distance $D_6$, the seventh distance $D_7$, and the eighth distance $D_8$, are independently 0 inches, the central region 106 is directly circumscribed by at least one of the first adhesive strip 130, the second adhesive strip 131, the third adhesive strip 132, and the fourth adhesive strip 133.

The first adhesive strip 130, the second adhesive strip 131, the third adhesive strip 132, and the fourth adhesive strip 132 may each be independently applied to at least one of the first major surface 201 of the second layer 200 or the second major surface 102 of the first layer 100 in a width of about ¼ of an inch to about ½ of an inch. The first adhesive strip 130, the second adhesive strip 131, the third adhesive strip 132, and the fourth adhesive strip 132 may each be applied to at least one of the first major surface 201 of the second layer 200 or the second major surface 102 of the first layer 100 in a width of about ⅜ of an inch.

Depending on the width of the first, second, third, and fourth adhesive strip 130, 131, 132, and 133 and the first, second, third, fourth, fifth, sixth, seventh, and eighth distance $D_1$, $D_2$, $D_3$, $D_4$, $D_5$, $D_6$, $D_7$, and $D_8$, the central region 106 of the first layer 100 may occupy between about 70% to about 99% of the surface area of the second major surface 102 of the first layer 100—the same surface area percentages apply to the central region 206 of the second layer 200. In some embodiments, the central region 106 of the first layer 100 may occupy between about 85% to about 95%, for example about 95%, of the surface area of the second major surface 102 of the first layer 100—the same surface area percentages apply to the central region 206 of the second layer 200.

The first adhesive strip 130, the second adhesive strip 131, the third adhesive strip 132, and the fourth adhesive strip 132 may each be applied to at least one of the first major surface 201 of the second layer 200 or the second major surface 102 of the first layer 100 in a thickness of about 0.01 inches to about 0.25 inches. The first adhesive strip 130, the second adhesive strip 131, the third adhesive strip 132, and the fourth adhesive strip 132 may each be independently applied to at least one of the first major surface 201 of the second layer 200 or the second major surface 102 of the first layer 100 in a thickness of about 0.03 inches.

In some embodiments, the adhesive 50 is applied to at least one of on the corners of the perimeter region 105 of the second major surface 102 of the first layer 100 or the perimeter region 205 of the first major surface 201 of the second layer 200.

The first, second, third, fourth, fifth, sixth, seventh, and eighth distances $D_1$, $D_2$, $D_3$, $D_4$, $D_5$, $D_6$, $D_7$, and $D_8$, described with respect to the central region 106 of the second major surface 102 of the first layer 100 also apply to the central region 206 of the first major surface 201 of the second layer 200.

In some embodiments of the present invention, the adhesive 50 is applied to at least one of the first major surface 201 of the second layer 200 or the second major surface 102 of the first layer 100 such that a total of about 10 g to about 30 g of adhesive 50 exists in the acoustic ceiling panel 20. In some embodiments of the present invention, the adhesive 50 is applied to at least one of the first major surface 201 of the second layer 200 or the second major surface 102 of the first layer 100 such that a total of about 15 g to about 30 g of adhesive 50 exists in the acoustic ceiling panel 25. In some embodiments of the present invention, the adhesive 50 is applied to at least one of the first major surface 201 of the second layer 200 or the second major surface 102 of the first layer 100 such that a total of about 20 g is applied.

As demonstrated by the non-limiting embodiments of FIGS. 7 and 8, the first adhesive strip 130, the second adhesive strip 131, the third adhesive strip 132, and the fourth adhesive strip 133 may each be a continuous strip of adhesive that collectively define and form a closed-geometry that circumscribes the central region 106 of the second major surface 102 of the first layer 100.

Figure 9:
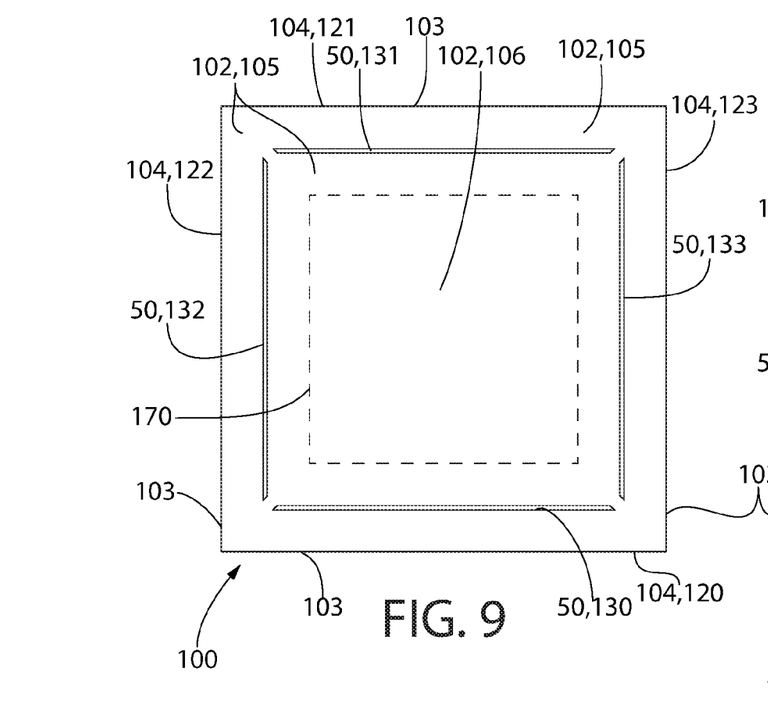
FIG. 9 is a top view of the first layer, showing the second major surface of the first layer according to another embodiment of the present disclosure.

As demonstrated by the non-limited embodiment of FIG. 9, the first adhesive strip 130, the second adhesive strip 131, the third adhesive strip 132, and the fourth adhesive strip 133 may each be a continuous strip of adhesive, wherein the first adhesive strip 130, the second adhesive strip 131, the third adhesive strip 132, and the fourth adhesive strip 133 of this embodiment are each discontinuous relative to one another.

Figure 10:
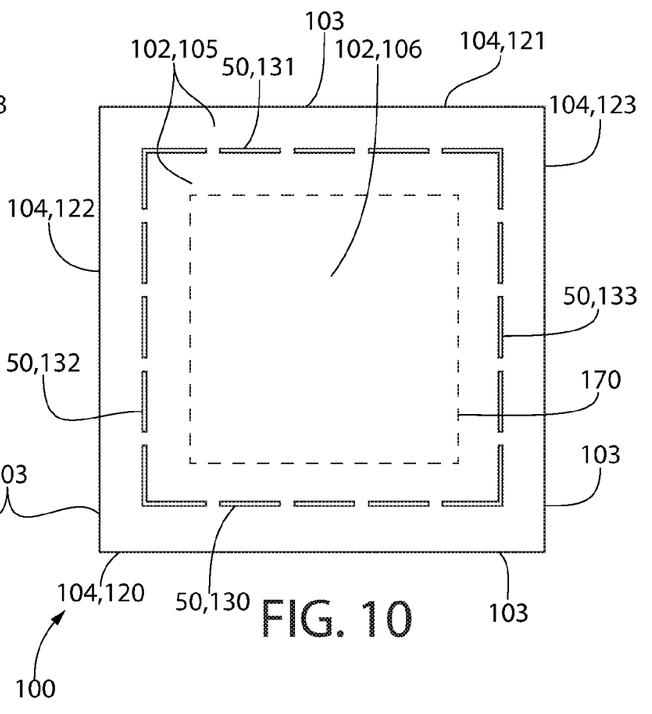
FIG. 10 is a top view of the first layer, showing the second major surface of the first layer according to another embodiment of the present disclosure.

As demonstrated by the non-limited embodiment of FIG. 10, the first adhesive strip 130, the second adhesive strip 131, the third adhesive strip 132, and the fourth adhesive strip 133 may each be intersecting, however, each of the first adhesive strip 130, the second adhesive strip 131, the third adhesive strip 132, and the fourth adhesive strip 133 may be a discontinuous strip of adhesive.

In one embodiment shown in shown in FIG. 7, the first adhesive strip 130 may span a length that is equal to a length of the first upper edge portion 120, the second adhesive strip 131 may span a length that is equal to a length of the second upper edge portion 121, the third adhesive strip 132 may span a length that is equal to a length of the third upper edge portion 122, and the fourth adhesive strip 130 may span a length that is equal to a length of the fourth upper edge portion 123. In this embodiment, the first adhesive strip 130 and third adhesive strip 132 overlap, the third adhesive strip 132 and the second adhesive strip 131 overlap, the second adhesive strip 131 and the fourth adhesive strip 133 overlap, and the fourth adhesive strip 133 and the first adhesive strip 130 overlap.

In one embodiment shown in shown in FIG. 8, the first adhesive strip 130 may span a length that is less than the length of the first upper edge portion 120, the second adhesive strip 131 may span a length that less than the length of the second upper edge portion 121, the third adhesive strip 132 may span a length that less than the length of the third upper edge portion 122, and the fourth adhesive strip 130 may span a length that is less than the length of the fourth upper edge portion 123. In this embodiment, each of the first adhesive strips 130, the second adhesive strip 131, the third adhesive strip 132, and the fourth adhesive strip 133 are contacting to form a closed-geometry.

Adhesive 50 may be applied to the first major surface 201 of the second layer using the same process, wherein the central region 106 of the first layer corresponds to the central region 206 of the second layer 200; the dotted boundary 170 of the first layer corresponds to a dotted boundary 270 of the second layer 270; the first, second, third, and fourth lower edge portions 220, 221, 222, and 223 of the second layer 200 correspond to the first, second, third, and fourth upper edge portions 120, 121, 122, and 123 of the first layer 100; and the first, second, third and fourth adhesive strips 130, 131, 132, and 133 may be applied adjacent to the corresponding first, second, third, and fourth lower edge portions 220, 221, 222, and 223 of the second layer 200.

In some embodiments of the present invention, the acoustic ceiling panels 20 of the present invention may be formed using a continuous process that includes passing the first layer 100 down a conveyor along a machine direction, wherein the second major surface 102 of the first layer 100 is exposed facing upward. As the first layer 100 passes along the machine direction, the second major surface 102 passes underneath a first glue unit which simultaneously applies the first adhesive strip 130 and the second adhesive strip 131 (not pictured). The first layer 100 can then turned 90 degrees and passed along the machine direction under a second glue unit that simultaneously applies the third adhesive strip 132 and the fourth adhesive strip 133 (not pictured). The continuous process is also suitable for applying the first adhesive strip 130, the second adhesive strip 131, the third adhesive strip 132, and the fourth adhesive strip 133 to the first face 201 of the second layer 200.

After application of the first adhesive strip 130, the second adhesive strip 131, the third adhesive strip 132, and the fourth adhesive strip 133 to at least one of the second major surface 102 of the first layer 100 and the first major surface 201 of the second layer 200, the second major surface 102 of the first layer 100 is joined to the first major surface 201 of the second layer 100.

Pressure may be applied to at least one of the second major surface 202 of the second layer 200 or the first major surface 101 of the first layer to aid in the adhesive bonding between the first and second layers 100. Heat may also be applied to the first layer 100 and the second layer 200 to ensure proper adhesive bonding between the first layer 100 and the second layer 200. Optionally, a scrim 300 may later be applied to the first major surface 101 of the first layer 100.

In non-limiting embodiments, the ceiling panel 20 may be a circle, oval, or polygon—e.g., rectangular (including square and non-square shapes) or triangular. According to these embodiments the first layer 100 and the second layer 200 share the shape of the overall ceiling panel 20. In some embodiments, the polygonal ceiling panels 20 may have rounded or sharp corners.

According to some embodiments, the ceiling panel 20 is substantially rectangular—the term "substantially rectangular" means a shape having four edges and four corners. Each corner forms angle ranging from 88 to 92 degrees—alternatively about a 90 degrees. The four edges are either the same length (square) or have a first pair of edges that are parallel to each other and extend a first length and a second pair of edges that are parallel to each other and extend a second length, wherein the first and second lengths are not equal (non-square). In some embodiments, the first pair of edges comprise the first upper edge portion 120 and the second upper edge portion 121, and the second pair of edges comprise the third upper edge portion 122 and the fourth upper edge portion 123.

In some embodiments, the ceiling panel 20 is rectangular, wherein the first pair of edges and second pair of edges each have a length of 2 feet. In some embodiments, the ceiling panel 20 has an overall thickness ranging from about 1.25 inches to about 2 inches—alternatively about 1.75 inches.

The acoustic ceiling panel of the present invention exhibits certain acoustical performance properties. Specifically, the American Society for Testing and Materials (ASTM) has developed test method E1414 to standardize the measurement of airborne sound attenuation between room environments 3 sharing a common plenary space 2. The rating derived from this measurement standard is known as the Ceiling Attenuation Class (CAC). Ceiling materials and systems having higher CAC values have a greater ability to reduce sound transmission through the plenary space 2—i.e. sound attenuation function.

Another important characteristic for the acoustic ceiling panel materials is the ability to reduce the amount of reflected sound in a room. One measurement of this ability is the Noise Reduction Coefficient (NRC) rating as described in ASTM test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection—sound absorption function.

Previous attempts to design acoustic ceiling panel shaving increased CAC values (i.e., desirable reduction of sound transmission through the plenary space 2), has been tied with a simultaneous decrease in sound absorption (NRC), which causes an increased amount of sound reflected within a given room environment 3. It has been discovered that by using the acoustic ceiling panel 20 of the present disclosure, an increase in CAC performance can be achieved without substantial loss in NRC performance.

Specifically, by coupling together the first layer 100 and the second layer 200 using adhesive 50 that is only applied to at least one of the perimeter regions 105, 205 of the first layer 100 or the second layer 200, while also keeping the central regions 106, 206 of the first layer 100 and the second layer substantially free of adhesive 50, it has been discovered that the resulting acoustic ceiling panel 20 will demonstrate a marked improvement in CAC performance while avoiding substantial detrimental change in NRC performance. According to the present disclosure, an insubstantial change in NRC performance is a loss of NRC value of less than or equal to (≤) 0.05.

Specifically, the acoustic ceiling panel 20 of the present disclosure has a CAC value of 35 or greater, preferably 40 or greater, and has an NRC value of 0.7 or greater, preferably 0.9 or greater. The first layer 100 may have an NRC value of at least 0.80, alternatively of at least 0.90. The second layer 100 may have an NRC value of at least 0.65, and a CAC value of at least 35.

In some embodiments, the acoustic ceiling panel 20 of the present disclosure is formed by using a second layer 200 that has a CAC value that is greater than a CAC value of the first layer 100. The second layer 200 may also have an NRC value that is less than the NRC value of the first layer 200. The first layer 100 may be a noise absorption layer that provides sound dampening within a single room environment 3. The second layer 200 may be a noise blocking layer that provides soundproofing between adjacent room environments 3 that share the same plenary space 2.

According to the present invention, once the acoustic ceiling panel 20 has been properly installed into ceiling grid 5 of the ceiling system 1, the second major surface 202 of the second layer 200 faces the plenary space 2 of the ceiling system 1.

The invention will be described in greater detail by way of specific examples. The following examples are offered for illustrative purposes and are not intended to limit the invention in any manner.

EXAMPLES

The Examples were prepared using a first layer comprised of fiberglass having the dimensions of 24 inches×24 inches×1 inch. The Examples were prepared using a second layer comprised of mineral wool having the dimensions of 24 inches×24 inches×0.75 inches. The first and second layers have the following acoustical properties:

Fiberglass First Layer

| NRC Value | 0.95 |
|---|---|
| CAC Value | N/A |

Mineral Wool Second Layer

| NRC Value | 0.70 |
|---|---|
| CAC Value | 40 |

For the purpose of this disclosure, each of the individual fiberglass ceiling panels has the same starting acoustical performance. For the purpose of this disclosure, each of the individual mineral wool sound attenuation layers has the same starting acoustical performance.

Examples 1 and 2 were prepared by adhering together the first and second layers using polyvinyl acetate as the adhesive. The adhesive was applied within the perimeter region of the first layer as first, second, third, and fourth continuous adhesive strips. Each of the adhesive strips were adjacent to the corresponding first, second, third, and fourth upper edges of the first layer by an offset distance of 3/8 inches. Each adhesive strip was applied with a width of 3/8 of an inch. Examples 1 and 2 each used a total of 20 g of adhesive. The central region of Examples 1 and 2 were substantially free of adhesive. Each of the central regions of the first and second layers each have the dimensions of about 22.5 inches×22.5 inches (506.25 sq. inches), making up about 88% of the surface area of each of the second major surface of the first layer and the first major surface of the second layer. The final thickness of the overall acoustic ceiling panel is set forth in the table below.

Comparative Example 1 was prepared by evenly applying eight parallel lines of polyvinyl acetate adhesive across the first major surface of the first layer—i.e. through the central region of the first layer. Comparative Example 1 used a total of 20 g of adhesive. Comparative Examples 2 and 3 were prepared by applying sixteen checker board lines across the first major surface of the first layer—i.e. through the central region of the first layer. Comparative Examples 2 and 3 each use a total of 20 g of adhesive. The final thickness of the comparative acoustic ceiling panels are set forth in the table below.

TABLE 1

| | Gauge (inches) | Glued | NRC | ΔNRC to Comp. Example 1 | CAC |
|---|---|---|---|---|---|
| Example 1 | 1.75 | Perimeter (20 g) | 0.95 | 0.05 (Insubstantial) | 43 |
| Example 2 | 1.75 | Perimeter (20 g) | 0.95 | 0.05 (Insubstantial) | 43 |
| Comparative Example 1 | 1.76 | 8 parallel Lines (20 g) | 1.00 | — | 40 |
| Comparative Example 2 | 1.77 | 16 check pattern lines (40 g) | 1.00 | — | 40 |
| Comparative Example 3 | 1.78 | 16 check pattern lines (40 g) | 1.00 | — | 39 |

As demonstrated by Table 1, applying adhesive according to the present disclosure results in a marked improvement in CAC performance with only an insubstantial drop of five one-hundredths in NRC value. Thus, applying the adhesive according to the present disclosure allows for improved in CAC performance without the substantial detrimentally affects the NRC performance.

Furthermore, applying adhesive according to the present disclosure invention surprisingly resulted in improved CAC performance with an overall ceiling panel thickness. CAC performance is a measure of soundproofing between adjacent room environments—typically, it is expected that as thickness of the barrier between adjacent room environments decreases, so does CAC performance. Thus, applying the adhesive according to the present disclosure allows for improved CAC performance while decreasing the volume required for such ceiling panel.

As those skilled in the art will appreciate, numerous changes and modifications may be made to the embodiments described herein, without departing from the spirit of the invention. It is intended that all such variations fall within the scope of the invention.

The invention claimed is:
1. An acoustic ceiling panel comprising:
a first layer comprising a first major surface and a second major surface, the second major surface of the first layer defined by a perimeter, the second major surface of the first layer comprising a perimeter region adjacent the perimeter of the second major surface of the first layer and a second region circumscribed by the perimeter region of the second major surface of the first layer;

a second layer comprising a first major surface and a second major surface, the first major surface of the second layer defined by a perimeter, the first major surface of the second layer comprising a perimeter region adjacent the perimeter of the first major surface of the second layer and a second region circumscribed by the perimeter region of the first major surface of the second layer;

wherein the second major surface of the first layer is coupled to the first major surface of the second layer and each of the second region of the second major surface of the first layer and the second region of the first major surface of the second layer being free of adhesive, whereby the first and second layers are coupled to each other to form a multilayer panel; and wherein the second region of the second major surface of the first layer occupies about 70% to about 99% of surface area of the second major surface of the first layer.

2. The acoustic ceiling panel according to claim 1, wherein the second region of the second major surface of the first layer is in contact with the second region of the first major surface of the second layer.

3. The acoustic ceiling panel according to claim 1 wherein the acoustic ceiling panel has a CAC value of 35 or greater.

4. The acoustic ceiling panel according to claim 1 wherein the acoustic ceiling panel has an NRC value of 0.7 or greater.

5. The acoustic ceiling panel according to claim 1, wherein the second layer has a CAC value that is greater than a CAC value of the first layer, and the first layer has an NRC value that is greater than an NRC layer of the second layer.

6. The acoustic ceiling panel according to claim 5, wherein the second layer has a CAC value of at least 35, and the first layer has an NRC value of at least 0.7.

7. The acoustic ceiling panel according to claim 1, wherein the second region of the second major surface of the first layer and the second region of the first major surface of the second layer are in free floating contact with respect to one another.

8. The acoustic ceiling panel according to claim 1, wherein the second region of the second major surface of the first layer occupies at least 95% of the second major surface of the first layer.

9. The acoustic ceiling panel according to claim 1, wherein the second major surface of the first layer is coupled to the first major surface of the second layer so that the perimeter of the second layer is aligned with the perimeter of the first layer.

10. The acoustic ceiling panel according to claim 1, wherein the first layer is a fiberglass layer and the second layer is a mineral wool layer.

11. An acoustic ceiling panel having a first major surface opposite a second major surface, the acoustic ceiling panel comprising:

a first layer comprising fiberglass and having a first NRC value and a first CAC value, the first layer comprising a first major surface and a second major surface, and the second major surface of the first layer comprising a first region;

a second layer comprising mineral wool and having a second CAC value and a second NRC value, the second layer comprising a first major surface and a second major surface, and the first major surface of the second layer comprising a second region;

the second major surface of the first layer is coupled to the first major surface of the second layer and each of the first region and second region being free of adhesive; and wherein the second CAC value is greater than the first CAC value, and the first NRC value is greater than the second NRC value and wherein the first region of the second major surface of the first layer occupies at least 70% of the second major surface of the first layer.

12. The acoustic ceiling panel according to claim 11, wherein the first region is in contact with the second region.

13. The acoustic ceiling panel according to claim 11, wherein the acoustic ceiling panel has a third CAC value as measured between the first major surface and the second major surface of the acoustic ceiling panel, the third CAC value being equal to or greater than the CAC value of the second CAC value.

14. The acoustic ceiling panel according to claim 13, wherein the acoustic ceiling panel has a third NRC value of 0.90 or greater.

15. The acoustic ceiling panel according to claim 13, wherein the third CAC value is at least 35, and the first NRC value is at least 0.7.

16. An acoustic ceiling panel comprising:

a first layer comprising a first major surface and a second major surface, the second major surface of the first layer comprising a first region and a second region;

a second layer comprising a first major surface and a second major surface, the first major surface of the second layer comprising a first region and a second region; and wherein each of the second region of the second major surface of the first layer and the second region of the first major surface of the second layer being free of adhesive, whereby the first and second layers are coupled to each other to form a multilayer panel, and wherein the second region of the second major surface of the first layer occupies about 70% to about 99% of surface area of the second major surface of the first layer.

17. The acoustic ceiling panel according to claim 16, wherein the first layer is a fiberglass layer and the second layer is a mineral wool layer.

18. The acoustic ceiling panel according to claim 16, wherein the second region of the second major surface of the first layer is in contact with the second region of the first major surface of the second layer.

19. The acoustic ceiling panel according to claim 16, wherein the second layer has a CAC value that is greater than a CAC value of the first layer, and the first layer has an NRC value that is greater than an NRC layer of the second layer.

* * * * *